D. E. HENNESSY.
WHEELED ELEVATING DEVICE.
APPLICATION FILED SEPT. 16, 1918.
1,360,112.
Patented Nov. 23, 1920
2 SHEETS—SHEET 1.
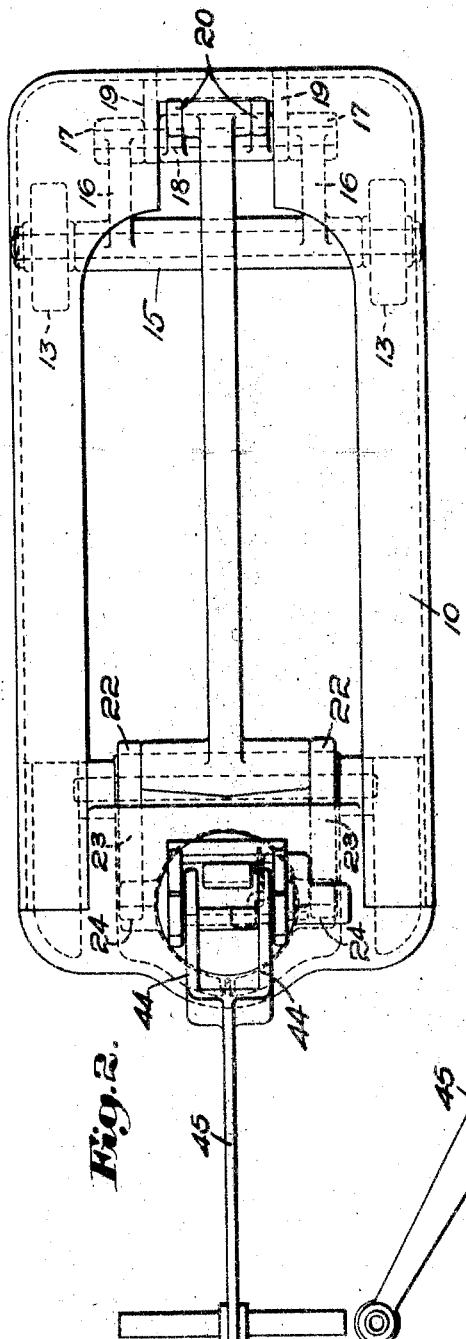
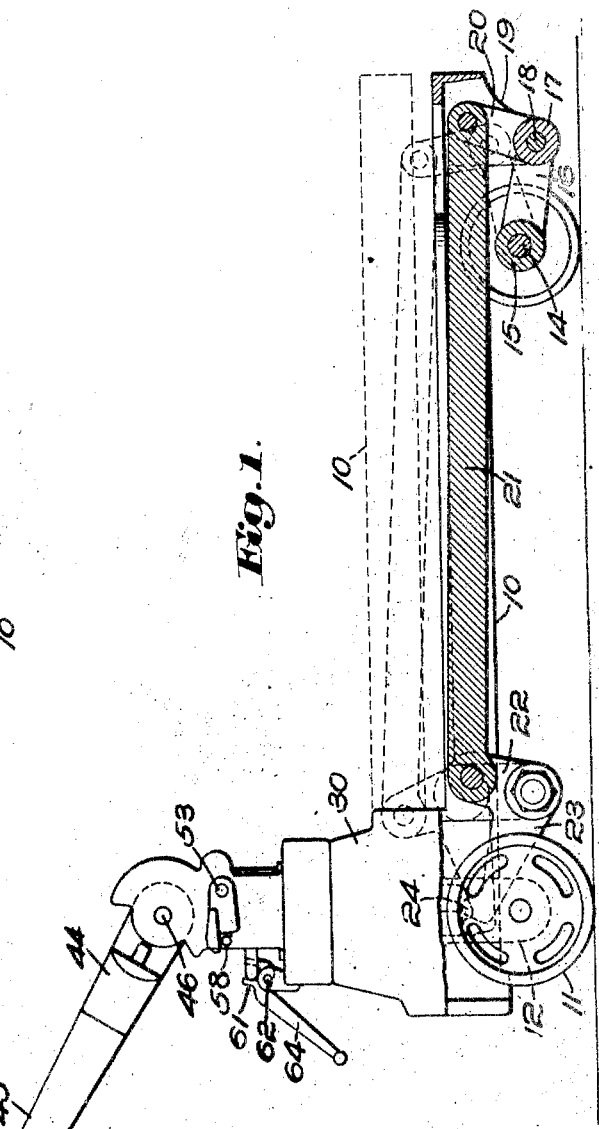
Inventor:
Daniel E. Hennessy.

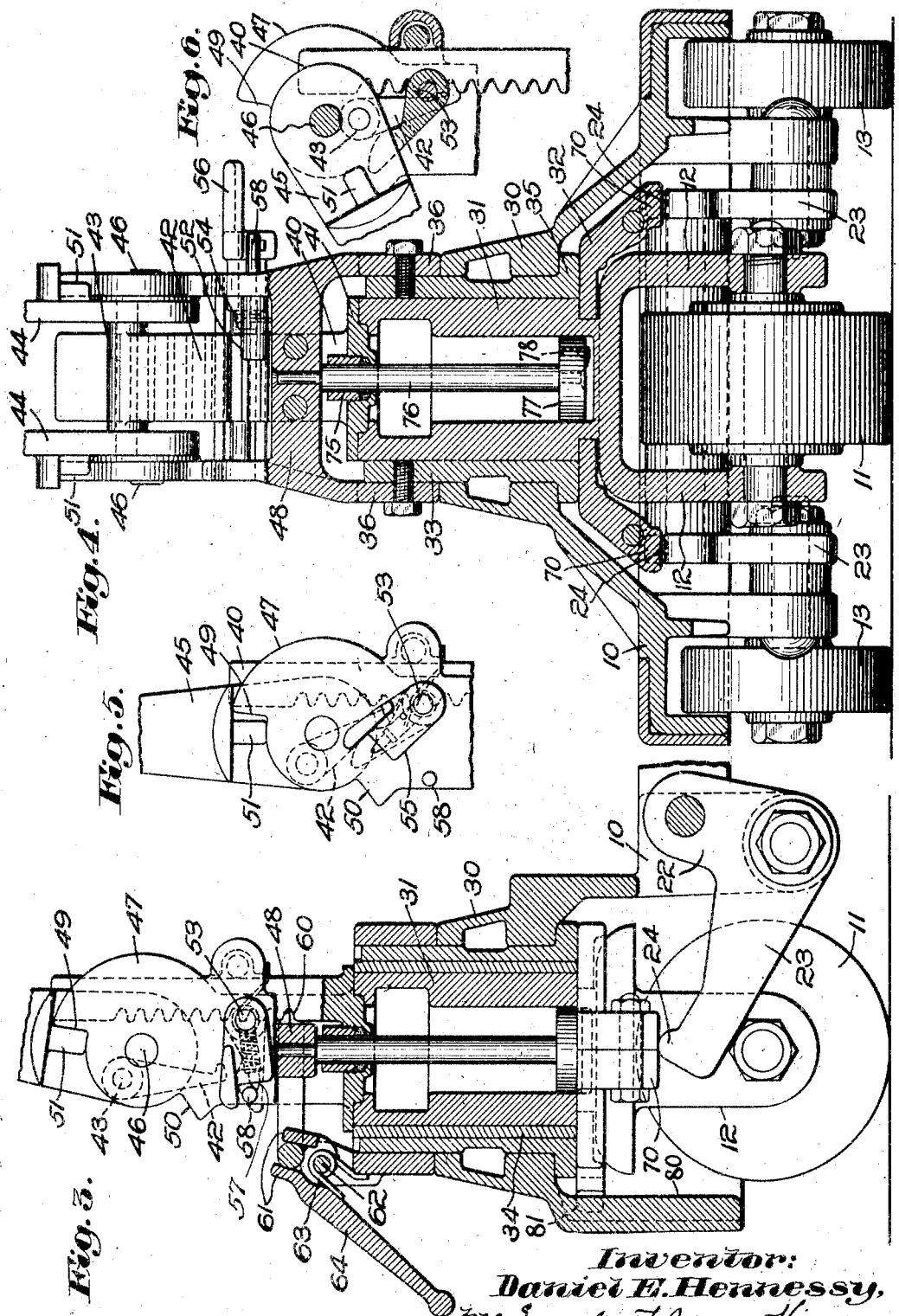

UNITED STATES PATENT OFFICE.

DANIEL E. HENNESSY, OF HOLYOKE, MASSACHUSETTS, ASSIGNOR TO THE STURDI-TRUCK COMPANY, OF NORTHAMPTON, MASSACHUSETTS, A CORPORATION OF MASSACHUSETTS.

WHEELED ELEVATING DEVICE.

1,360,112.      Specification of Letters Patent.     Patented Nov. 23, 1920.

Application filed September 16, 1918. Serial No. 254,239.

*To all whom it may concern:*

Be it known that I, DANIEL E. HENNESSY, a citizen of the United States, and a resident of Holyoke, in the county of Hampden and Commonwealth of Massachusetts, have invented an Improvement in Wheeled Elevating Devices, of which the following description, in connection with the accompanying drawings, is a specification, like characters on the drawings representing like parts.

This invention relates to wheeled elevating devices, and more particularly to elevating trucks, the object being to produce a simple, efficient construction.

The invention will be best understood by reference to the following description when taken in connection with the accompanying illustration of one specific embodiment thereof, while its scope will be more particularly pointed out in the appended claims.

In the drawings:—

Figure 1 is a side elevation partly in longitudinal section showing an elevating truck embodying one form of the invention;

Fig. 2 is a plan view of the truck shown in Fig. 1;

Fig. 3 is a central, longitudinal section in elevation showing parts associated with the steering head;

Fig. 4 is a transverse, sectional elevation of the same portion of the truck;

Fig. 5 is a detail showing the lifting mechanism in a different relation from what is shown in Fig. 3; and Fig. 6 is a similar view showing the lifting mechanism in still another position.

Referring to the drawings and to the embodiment of the invention which I have there selected for illustration, the truck there shown comprises a single load-supporting frame or platform 10 of generally rectangular outline mounted upon suitable wheeled supports. The forward end of the truck is mounted upon a wheeled support consisting of the single wheel 11 journaled in the forked member 12 (Figs. 3 and 4). The rear wheeled supports comprise the two truck wheels 13—13 secured to the axle 14.

To elevate the load-sustaining platform, the rear end of the platform has a movable connection to the rear truck wheels 13, this connection herein consisting of the sleeved member 15 in which the axle 14 is journaled, the sleeve being provided with a pair of arms 16 connected to a second sleeve 17 adapted to turn upon a fixed shaft or rod 18 carried by ears 19 depending from the platform 10. Connected to the sleeve 17 is a pair of upright arms 20 having a jointed connection to the forwardly extending reach rod or link 21. The relation of these parts is such that if the reach rod is drawn forward, the sleeve 17 is turned about its pivotal support in the frame, tending to lift the latter and elevate the frame relatively to the wheels, the parts assuming the dotted-line position indicated in Fig. 1. Opposite movement of the reach rod is accompanied by a lowering movement of the platform from the dotted-line position to the full-line position shown in Fig. 1.

At its forward end the reach rod 21 has a jointed connection to the arms 22 of front bell-crank members, the inclined bell-crank arms 23 terminating each in a cam-shaped member 24. When the front end of the truck is lifted the members 24 are brought into contact with fixed parts on the front wheeled support and cause the simultaneous elevation of the rear end thereof.

Referring now to the elevating and steering devices at the forward end of the truck, the latter is provided with a steering head 30 which is herein rigidly connected to the platform 10 to provide a swiveled support between the platform and the wheeled support 11. Within the steering head the wheel fork 12 is provided with an upwardly extending sleeve-shaped member 31, there being a necked-down portion between the fork and the sleeve about which is secured the encircling flanged member 32, the latter, however, being capable of a relative turning movement on the fork. Between the steering head 30 and the upright sleeve 31, there is provided an intermediate sleeve member 33 which has such connection with the upright sleeve 31, as by the keys 34 (see Fig. 3), that the inner and intermediate sleeves turn together as one member, while permitting the vertical sliding or lifting movement of the intermediate sleeve 33 relatively to the inner sleeve 31.

The connection between the intermediate sleeve and the steering head, however, is such that the intermediate sleeve is permitted to freely turn within the head, but the steering head and intermediate sleeve are so fastened that they move up or down together. This result may be secured in any desired way, but herein the intermediate sleeve has a bottom flange 35 and an upper clamping collar 36, the latter fixedly secured to the sleeve, the steering head being confined between the lower flange 35 and the clamping collar 36 so as to move up and down with the sleeve but to permit the latter to freely turn within the head. The collar 36, intermediate sleeve 33 and supporting wheel 11, therefore, turn as a unit. The intermediate sleeve and collar, however, while rotatable with relation to the steering head 30, are longitudinally fixed with relation thereto in virtue of the flanged end 35 and the abutting engagement of the collar with the upper end of the steering head, and are, therefore, adapted to move longitudinally and raise or lower as a unit with the platform or steering head. The lower flange 35 has a bearing on the upper face of the flanged member 32.

To raise or lower the steering head upon the upright sleeve member, any suitable means may be employed, but herein I have provided devices in the form of a ratchet or rack and lifting pawl, one of which is secured to the upright sleeve 31 and the other to the collar 36.

As shown in the drawings (Figs. 3, 4 and 5), the ratchet or rack 40 is secured to the head or plate 41 which is bolted to the upper end of the sleeve 31 and forms a closure for the space within the same, as will more fully appear. The ratchet is in the form of an upright toothed rack having broad teeth and adapted to engage with a broad toothed pawl 42 pivoted at 43 between the two forked arms 44 of the combined lifting and steering handle 45. The latter, in turn, is pivoted at 46 upon the upright ears 47 which project upwardly from the collar 36 (Fig 4.) and carry between them also the bridge or arch piece 48. The handle 45 (Figs. 1 and 2) is of any suitable shape or size, so that it may be conveniently raised or lowered for lifting and swung to one side or the other for steering the truck. The ears 47 are preferably provided with shouldered portions 49 and 50 which coöperate with the lugs 51 on the side of the handle forks 44 so as to limit the upward and downward movements of the handle and position it in substantially horizontal or vertical positions when not in use for lifting. The pawl 42 is pivoted upon the handle forks eccentrically, so that as the handle is first raised the pawl may be brought into engagement with a tooth of the rack. As it is depressed, the pawl moves from some such position as shown in Fig. 5 to that shown in Fig. 6, lifting the parts connected to the handle, including the ears 47, collar 36, sleeve 33 and platform 10. It will be observed that as the handle moves from its upper position to the depressed position, the pivot of the pawl approaches closely to the rack and the pawl assumes a more nearly vertical position, providing a toggle action.

Herein the pawl may be resiliently pressed toward the teeth of the rack by means of the pivoted arm 52 which presses against the back of the pawl, the arm being secured to the shaft 53 pivoted in the adjoining upright ear 47 and being normally spring-pressed by means of the coil spring 54, as shown in Fig. 4, to force the pawl toward the rack. When desired, however, the pawl may be freed from engagement with the teeth of the rack, permitting the lever to be swung up or down at will without affecting the position of the rack. Any suitable means may be employed for this purpose, but herein the shaft 53 has secured to it an arm 55 carrying the throw-out plate 56, and having protruding from the end of the arm the beveled end of the spring-pressed pin 57. When the plate 56 is pressed down into the position shown in Fig. 3, the projecting pin 57 snaps past a laterally projecting stationary pin 58 secured to the adjoining ear 47, this serving to hold the plate 56 and the pivoted arm 52 in the position shown in Fig. 3 until reverse pressure is applied to the plate sufficient to snap the pin 57 up past the stationary pin 58, whereupon the parts assume the position shown in Figs. 5 and 6 and press the pawl resiliently toward the teeth of the rack. The plate can be actuated in either direction by applying thereto a slight pressure either of the hand or the foot, so that the lifting mechanism can be quickly and readily thrown into or out of operation.

The lifting of the front end of the platform is, therefore, accomplished by reciprocatively moving the lifting handle up and down, the pawl engaging a fresh tooth with each upward movement of the handle and causing the elevation of the collar 36 and the attached parts when the handle is depressed.

As the collar 36 and attached parts are raised step by step, they are automatically held against a lowering movement by any suitable means, such as the locking dog 66, this being in the form of a U-shaped member slidable horizontally in the bridge piece 48 and having its ends suitably shaped to enter between and engage with the teeth of the rack 40 and prevent the latter from dropping. The shape of the teeth is such that the lifting movement of the rack automatically forces the dog outwardly, but when the dog enters between the teeth the rack is locked thereby against downward movement. To resiliently press the dog into locking engagement with the teeth of the rack, it is herein carried in a socket formed between the walls 61 of a controlling member, the latter being pivoted at 62 upon the collar 36 and being normally moved by the coil spring 63 so as to force the dog inwardly against the rack. The controlling member is provided with the projecting arm 64 so arranged that it may be depressed at any time to withdraw the locking dog and allow the rack and the attached parts to descend. When the platform is elevated, it can, therefore, be left in that position when the lifting handle is disengaged from the elevating device, leaving the latter free to be used to steer the truck. As soon as it is desired to lower the load, the platform can be instantly released for lowering movement by pushing the releasing lever 64 downwardly. When the platform has been lowered to its lowest position, the locking pawl 60 and throw-out lever 64 will automatically move back into place as soon as the pressure is withdrawn from the lever.

It will be seen that the forward end of the truck is lifted by a linear vertical lifting movement. The lifting movement of the front end of the platform, however, carries with it the bell-crank levers 23 which are pivoted thereon. The cam members 24 are thereby caused to press against bearing walls 70 arranged at diametrically opposite points on the flanged bearing member 32 and, as the lifting movement continues, this swings the bell-cranks on their axes, drawing the reach rod 21 forward and lifting the rear end of the truck simultaneously and equally with the forward end thereof. When the platform is fully elevated, the rear crank arms 16 and 20 assume positions which bring the shaft or rod 18 in a substantially vertical line over its position when the truck is lowered, so that the lifting movement of the rear end of the truck, as well as the forward end, is in an approximate vertical direction.

The split bearing member 32 embraces the upright wheeled support between the forks 12 and the upright sleeve 31, being prevented from moving up on the sleeve by the shouldered portion thereof which overlies the bearing member 32. The latter, however, is prevented from turning with the wheeled support as the latter is swung about its axis, by means of a vertical rib 80 (Figs. 2 and 3) which is formed on the apron or side of the platform 10 directly in front of the supporting wheel 11, and which works between a forked projecting piece 81 extending forwardly from the split bearing member 32. As the platform is raised or lowered, the rib 80 has a continuing engagement with the forked projection, maintaining the bearing member in fixed alinement with relation to the truck.

Herein I have also shown associated with the lifting mechanism, a check device in the form of a liquid check. To provide such liquid check, herein the upright sleeve member 31 is in the form of a cylinder, the upper end of which is closed by the plate 41 serving as a cylinder head provided with a stuffing box 75 through which the piston rod 76 passes. The upper end of the piston rod is rigidly connected to the bridge piece 48 on the collar 36, while the lower end is secured to the piston member 77 working within the cylinder, the space above the piston being filled with some suitable liquid such as oil.

As the platform is raised and the piston 77 moves upward in the oil chamber, the oil passes into the gradually increasing space below the piston either through leakage or clearance spaces provided, or through other suitable valve passages such as the valve-controlled passage 78. When the raised platform is allowed to descend, the body of oil will check its descent, the oil escaping slowly through the clearance space around the piston 77 into the upper oil chamber and allowing the slow, gradual descent of the platform.

It will be seen that the handle 45, being swiveled upon the collar 36, may be turned to any position about the upright steering axis, while at the same time being available in any such position to effect the lifting movement of the platform. The construction herein described not only provides a simple but effective and powerful elevating truck, but permits the disposition of the load close to the steering head and avoids all obstructions between the wheeled supports and below the lifting platform which ordinarily interfere with the use of such a truck where sharp inclines are encountered.

While I have herein shown one form of my invention embodied in an elevating truck, many of the features thereof may be embodied in a wheeled lifting jack, such, for example, as might consist of a steering head with its front wheeled support only, the lifting frame comprising a toe or foot secured to the steering head and adapted to be placed under and elevate one end of the load only.

Other applications of the generic features of the invention, may be made, and while I have herein shown and described for purposes of illustration one specific form of the invention, it is to be understood that the same may be varied as to the form, construction and relative arrangement of the parts without departing from the broad spirit thereof.

Claims:

1. In an elevating truck, the combination with a supporting frame and platform having front and rear wheeled supports, of means for elevating the frame thereon, comprising a toothed member on the front wheeled support, a combined steering and lifting lever on the frame, and a pawl eccentrically mounted on said lever and adapted to engage the toothed member to move the same and elevate the frame relatively to the front wheeled support and the toothed member.

2. An elevating truck having wheeled supports at the opposite ends thereof, a main frame constituting both an elevating platform for the load and a connecting frame for the wheeled supports, an upright member secured to the front wheeled support and having swiveled connection with the main frame, the latter being capable of lifting movement with relation to said upright member, and means for lifting the front end of the frame with relation to said upright member, said means including a rack connected to one part and a lifting handle with its pawl engaging the teeth of the rack connected to the other part, said lifting handle being mounted to turn said forward wheeled support in its swiveled connection and steer the truck.

3. In an elevating truck, the combination with an elevating platform, of a wheeled support, a steering head in which said wheeled support is swiveled, a member adapted to lift with said platform and to turn with said wheeled support, a lifting lever pivoted to said member, a part connected to said swiveled support, and a step by step lifting device carried by said lever adapted to engage directly with the part secured to said wheeled support to lift the platform relatively thereto.

4. In an elevating truck, the combination with an elevating platform member of a wheeled supporting member having a swiveled connection to the platform, lifting means to lift the platform about its swiveling axis relatively to the wheeled supporting member and including a combined lifting and steering lever mounted on one of said members, a pawl carried by said lever and a part mounted on the other of said members and adapted to be engaged by said pawl.

5. In an elevating truck, the combination with an elevating platform, of a wheeled support swiveled therein, lifting means including a combined lifting and steering member, a pawl actuated thereby, and a toothed lifting member adapted to be engaged by the pawl, said toothed member and said pawl being both mounted to turn with said wheeled support, but connected one to the lifting platform and the other to the wheeled support to partake of their relative lifting movement.

6. An elevating truck having front and rear wheeled supports, an elevating platform, a steering head, an upright member secured to the front wheeled support, a combined lifting and turning member secured to the upright member to turn therewith but capable of vertical movement to lift with said steering head, a combined lifting and steering lever pivoted to said turning and lifting member, a pawl carried thereby, and a member secured to said upright member and adapted to be engaged by said pawl to lift the platform with relation thereto.

7. In an elevating truck, the combination with a wheeled support of an elevating platform in which said wheeled support is swiveled, means for lifting the front end of said platform with relation to said wheeled support, means for lifting the rear end of said platform, said last-named means including a vertically fixed bearing device non-rotatable with relation to said elevating platform, and a member adapted to be raised by the lifting movement of the front end of said platform and adapted to engage said vertically fixed bearing device.

8. An elevating truck comprising load-supporting means and a wheeled support, the former being capable of a lifting movement relatively to the latter and the wheeled support being swiveled in the load supporting means, steering mechanism including a combined steering and lifting lever mounted to swing vertically, means operated by the movement of said lever to raise said load-supporting means including two engaging, toothed members, one mounted on the wheeled support and the other on said load-supporting means adapted to lift therewith relatively to the first toothed member when the lever is moved vertically, and a vertically arranged dash pot connected between the load-supporting means and the wheeled support.

9. An elevating truck comprising load-supporting means and a wheeled support with steering mechanism including a combined steering and lifting lever mounted to swing vertically, means operated by the movement of said lever to raise said load-supporting means relatively to the wheeled support including two engaging, toothed members, one mounted on the wheeled support and the other on said load-supporting means and adapted to lift therewith relatively to the first toothed member when the lever is moved vertically, connections between the steering lever and the wheeled support to turn the latter about an upright steering axis and a dash pot located in the steering axis.

10. In an elevating truck, load-supporting means, a wheeled support swiveled therein, a combined steering and lifting handle mounted to swing vertically and adapted to turn said swiveled wheeled support, means operated by the movement of said lever to raise said load-supporting means about its swiveling connection to said wheeled support and including two engaging toothed members, one mounted on the wheeled support and the other on said load-supporting means and adapted to lift therewith relatively to the first toothed member when said lever is moved vertically.

11. An elevating truck comprising load-supporting means, a wheeled support, a steering head, a combined steering and lifting lever, a pawl adapted to be actuated by a movement of the lever, a toothed member engaged by said pawl, and mounted on the wheeled support and a lifting member adapted to communicate the lifting movement to said load-supporting means, said lifting member being coaxial with said steering head and having a lifting movement relatively to the wheeled support and the toothed member.

12. An elevating truck comprising a lifting frame, a wheeled support, a combined lifting and steering lever mounted to move with said lifting frame, a toothed member mounted on said wheeled support with relation to which said frame has a lifting movement and a toothed member engaging the same and adapted to be moved by the vertical movement of said combined steering and lifting member.

In testimony whereof I have signed my name to this specification.

DANIEL E. HENNESSY.